United States Patent
Maruhashi

(10) Patent No.: US 9,118,726 B2
(45) Date of Patent: Aug. 25, 2015

(54) NETWORK DEVICE, AND CONTROL METHOD AND STORAGE MEDIUM THEREFOR

(75) Inventor: Kazuaki Maruhashi, Kawasaki (JP)

(73) Assignee: CANON KABUSHIKI KAISHA (JP)

(*) Notice: Subject to any disclaimer, the term of this patent is extended or adjusted under 35 U.S.C. 154(b) by 143 days.

(21) Appl. No.: 12/910,224

(22) Filed: Oct. 22, 2010

(65) Prior Publication Data
US 2011/0134801 A1 Jun. 9, 2011

(30) Foreign Application Priority Data
Dec. 8, 2009 (JP) ................................ 2009-278511

(51) Int. Cl.
*H04L 12/28* (2006.01)
*H04L 29/06* (2006.01)

(52) U.S. Cl.
CPC ...................................... *H04L 69/24* (2013.01)

(58) Field of Classification Search
USPC ......... 370/232, 233, 234, 235, 252, 253, 419, 370/420; 714/708; 710/60
See application file for complete search history.

(56) References Cited

U.S. PATENT DOCUMENTS

| 6,509,988 B1* | 1/2003 | Saito ................................ 398/47 |
| 7,792,023 B2* | 9/2010 | Vijeh et al. ..................... 370/230 |
| 2004/0102976 A1* | 5/2004 | Pochueva .................... 704/270.1 |
| 2004/0181658 A1* | 9/2004 | Haswarey et al. ................. 713/1 |
| 2004/0199834 A1* | 10/2004 | Fukae ........................... 714/699 |
| 2004/0242216 A1* | 12/2004 | Boutsikakis .................. 455/418 |
| 2010/0322105 A1* | 12/2010 | Diab ............................. 370/254 |

FOREIGN PATENT DOCUMENTS

| JP | 10-285218 A | 10/1998 |
| JP | 2003-258937 A | 9/2003 |

* cited by examiner

*Primary Examiner* — Alvin Zhu
(74) *Attorney, Agent, or Firm* — Rossi, Kimms & McDowell LLP

(57) ABSTRACT

A network device capable of performing auto-negotiation at a proper communication speed. In the network device, a cable speed setting unit decides, based on LAN cable category information, a maximum communication speed that can be guaranteed by a LAN cable connected to a physical layer circuit of the network device, and a speed decision unit compares the maximum communication speed notified from the cable speed setting unit with each of communication speeds that can be set for the physical layer circuit and decides an upper limit communication speed for use when a communication speed is decided by auto-negotiation.

13 Claims, 5 Drawing Sheets

FIG.2

| LAN CABLE CATEGORY | LAN STANDARD |
|---|---|
| CATEGORY 3 | 10Base-T |
| CATEGORY 4 | TOKEN RING (16M) |
| CATEGORY 5 | 100Base-TX |
| CATEGORY 5E | 1000Base-T |
| CATEGORY 6 | 1000Base-TX |

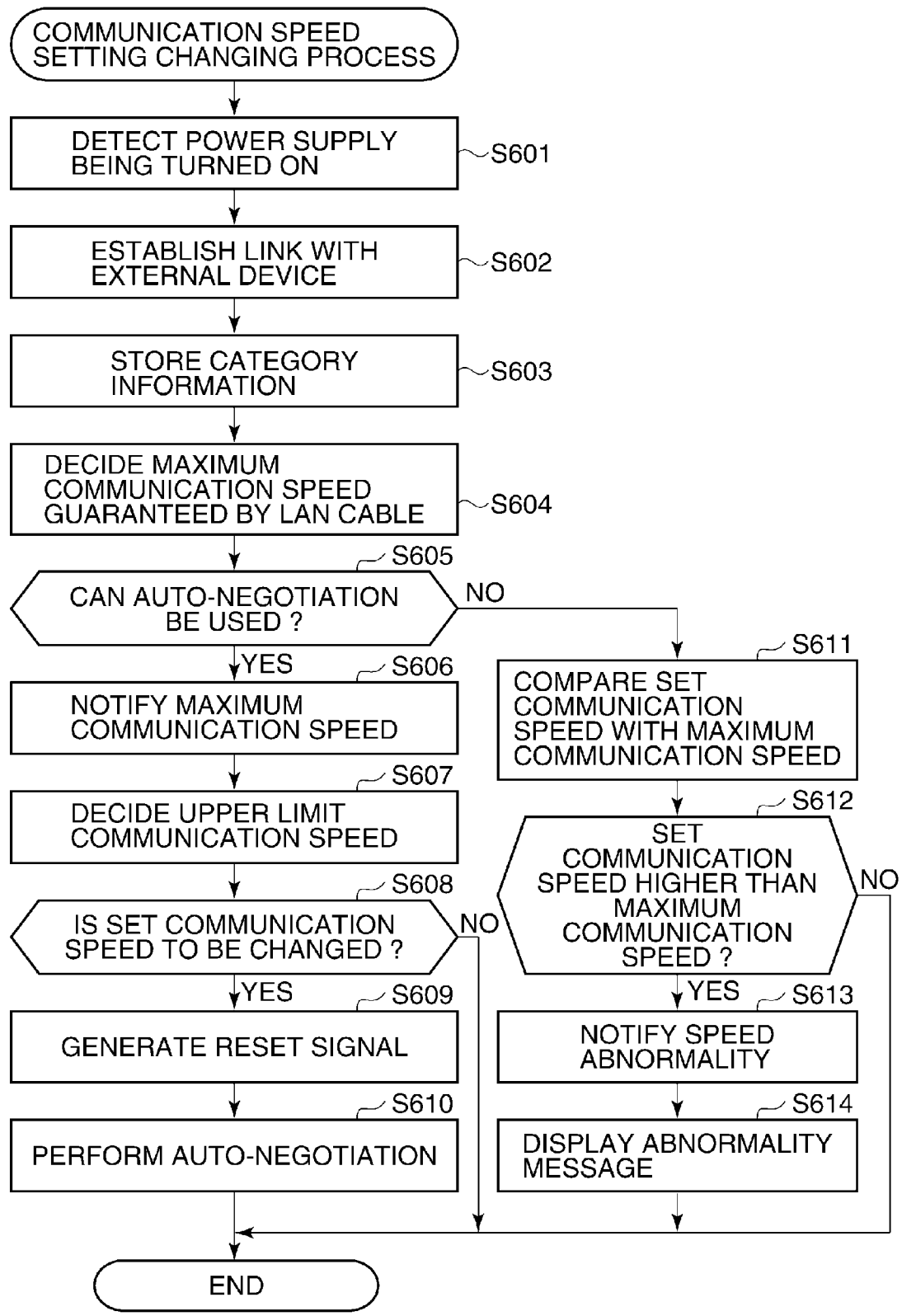

NETWORK DEVICE, AND CONTROL METHOD AND STORAGE MEDIUM THEREFOR

BACKGROUND OF THE INVENTION

1. Field of the Invention

The present invention relates to a network device capable of deciding a communication speed that matches a network cable type, and relates to a control method and storage medium for the network device.

2. Description of the Related Art

Among network devices (such as printers and multi-function peripherals) each having a network interface, some network device has an auto-negotiation function for automatically setting the fastest communication speed among communication speeds that can be established between the network device and an external network device, which is connected to the network device via a network and a network cable (e.g., a LAN cable). With the auto-negotiation function (hereinafter sometimes referred to as the auto-negotiation), the fastest communication speed can be selected without the need for a user to intentionally select the communication speed matching the LAN cable type.

A LAN cable has a guaranteed communication speed that varies according to the type (hereinafter sometimes referred to as the category) thereof. For example, a so-called category 3 LAN cable, which is compatible with 10Base-T Ethernet (registered trademark, omitted hereinafter) standard, guarantees a maximum communication speed of 10 Mbps, but does not guarantee a maximum communication speed of 100 Mbps guaranteed by 100Base-TX. To use the category 3 LAN cable, therefore, the communication device must be linked with the external network device at a 10Base-T communication speed, which is set to be equal to or lower than 10 Mbps without using the auto-negotiation.

Nevertheless, the network device is often used at a communication speed which does not match the LAN cable category, and in most cases the auto-negotiation is used because of its convenience that a user is not required to intentionally set a communication speed at each network connection.

Between network devices each having the auto-negotiation function, it is possible to transmit and receive an FLP (fast link pulse) signal including information that represents communication speeds settable in each device and duplex information that represents full-duplex communication or half-duplex communication.

On the other hand, a network device having a fixedly set communication speed transmits an NLP (normal link pulse) signal that only includes communication speed information, and hence another network device using the auto-negotiation cannot obtain duplex information from the NLP and operates in half-duplex. In that case, there is a fear that an unstable communication state occurs between the network device that uses the auto-negotiation and operates in half-duplex and the network device that does not use the auto-negotiation and operates in full-duplex.

Since the FLP used for the auto-negotiation is low in speed, network devices can communicate with each other irrespective of their LAN cable categories. For example, even if a category 3 LAN cable compatible with a 10Base-T communication speed is used, a link can be established between network devices at a 100Base-TX communication speed higher than the 10Base-T communication speed. In other words, communication can be carried out at a 100Base-TX communication speed, while using a category 3 LAN cable.

Japanese Laid-open Patent Publication No. 2003-258937, for example, proposes a communication apparatus that stores information of an initially established communication speed, periodically monitors the communication speed in the communication, and performs the auto-negotiation to reestablish the initial communication speed when a reduction in communication speed is detected.

However, in an environment where a mismatch between LAN cable category and communication speed can cause a reduction in communication speed, if the auto-negotiation is performed to reestablish the initial communication speed when a reduction occurs in communication speed, the communication speed becomes not matching the LAN cable category, so that an unstable communication state is continued.

SUMMARY OF THE INVENTION

The present invention provides a network device capable of performing auto-negotiation at a proper communication speed, and provides a control method and a storage medium for the network device.

According to a first aspect of this invention, there is provided a network device able to communicate with an external device via a network cable, which comprises a connection unit configured to be connected with the network cable, a storage unit configured to store category information for the network cable, a first decision unit configured to compare a maximum communication speed corresponding to the category information stored in the storage unit with each of at least one communication speed settable for the connection unit and decide an upper limit communication speed in communication between the network device and the external device, and a second decision unit configured to perform auto-negotiation with the external device based on the upper limit communication speed decided by the first decision unit and decide a communication speed to be used for communication between the network device and the external device.

According to a second aspect of this invention, there is provided a control method for the network device described in the first aspect.

According to a third aspect of this invention, there is provided a storage medium storing a program for executing the control method described in the second aspect.

With this embodiment, the network device that uses the auto-negotiation can decide the upper limit communication speed, which is equal to or lower than the maximum communication speed falling within a communication speed range corresponding to the network cable category. It is therefore possible to prevent the communication speed from being set by auto-negotiation to a speed exceeding the upper limit communication speed corresponding to the network cable category, whereby a packet loss in the communication and the like can be prevented, so that unstable communication can be avoided. It is also possible to match the communication speed with the network cable category, even if a user does not know the communication speed matching the LAN cable category.

Further features of the present invention will become apparent from the following description of exemplary embodiments with reference to the attached drawings.

BRIEF DESCRIPTION OF THE DRAWINGS

FIG. 2 is a view showing an example relation between LAN cable categories and LAN standards;

FIG. 5 is a flowchart showing an example of a communication speed setting changing process executed by the network device.

DESCRIPTION OF THE EMBODIMENTS

The present invention will now be described in detail below with reference to the drawings showing a preferred embodiment thereof.

Figure 1:
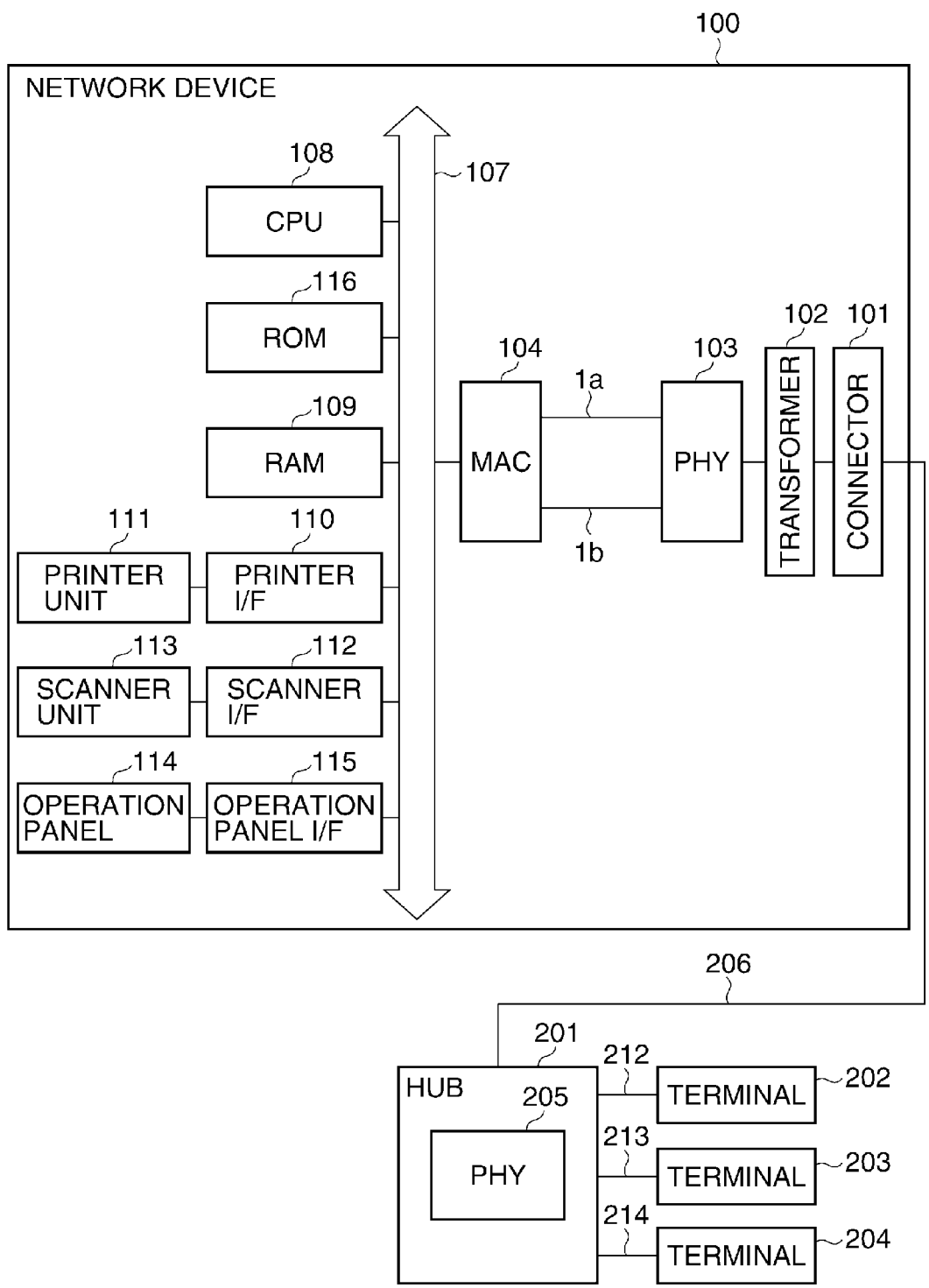
FIG. 1 is a block diagram showing the hardware construction of a network device according to one embodiment of this invention.

FIG. 1 shows in block diagram the hardware construction of a network device according to one embodiment of this invention.

In FIG. 1, the network device 100 is configured, for example, as a multi-function peripheral having the functions of printing, scanning, etc. Reference numeral 101 denotes a connector to which a modular jack of a LAN cable 206 is connected; 102, a transformer for electrically isolating the network device 100 from networks; and 103, a physical layer circuit (PHY) for connecting the network device 100 with external network devices. The PHY 103 is implemented by, e.g., an LSI (large-scale integrated circuit).

Reference numeral 104 denotes a MAC (media access controller) for converting a signal received by the PHY 103 into a signal that can be handled by the network device 100; 108, a CPU that executes a control program to control the network device 100; 109, a RAM (random access memory) for temporarily storing the program to be executed by the CPU 108; and 116, a ROM (read only memory) that stores setting values, initial data, etc. for use by the network device 100.

Reference numeral 111 denotes a printer unit for printing characters and images; 113, a scanner unit for scanning, e.g., originals and images; and 114, an operation panel for displaying a state of the network device 100 and for inputting a user's instruction. Reference numeral 110 denotes a printer unit I/F (interface) for connection with the printer unit 111; 112, a scanner unit I/F for connection with the scanner unit 113; 115, an operation panel I/F for connection with the operation panel 114; and 107, a bus.

Reference numeral 1a denotes a control signal line through which setting information and a control signal from the CPU 108 are transmitted between the MAC 104 and the PHY 103; and 1b, a reception data line through which a packet received from a network by the PHY 103 is transmitted to the MAC 104.

The connector 101 is connected via the LAN cable 206 to a hub 201. The hub 201 is capable of exchanging a packet with external network devices (hereinafter sometimes referred to as the external devices), which are respectively connected via LAN lines 212 to 214 to the hub 201, and capable of broadcast-transferring a packet to the external devices. The hub 201 includes a PHY 205 which is similar in function to the PHY 103 and which is used for connection with the external devices.

The external devices are, e.g., terminals 202 to 204 which are implemented by, e.g., information processing devices such as personal computers capable of requesting the network device 100 to perform printing, scanning, etc.

The network device 100 is connected to the hub 201 via the LAN cable 206 and able to communicate with respective ones of the terminals 202 to 204 via the hub 201. The network device 100 has an auto-negotiation function for automatically setting the fastest communication speed among communication speeds settable between the network device 100 and a connection destination device.

A packet transmitted from any of the external devices is transferred to the PHY 103 via the corresponding network, hub 201, LAN cable 206, connector 101, and transformer 102. A physical maximum communication speed between the network device 100 and the external device is set by the PHY 103. The packet transferred to the PHY 103 is delivered to the MAC 104 via the reception data line 1b, and then properly processed by the program executed by the CPU 108. For example, according to the program executed by the CPU 108, the packet is transferred from the MAC 104 to the printer unit 111 or to the scanner unit 113.

The operation panel I/F 115 converts a user's instruction accepted by the operation panel 114 into a signal, and transfers the signal to the CPU 108 via the bus 107. According to the program stored in, e.g., ROM 116 and executed by the CPU 108, predetermined information is displayed on the operation panel 114.

A control signal from the CPU 108 is notified to the PHY 103 via the control signal line 1a at the maximum communication speed set in the PHY 103. The maximum communication speed can be set in the PHY 103 in accordance with an instruction if given from the CPU 108.

FIG. 2 shows an example relation between LAN cable categories and Ethernet standards (LAN standards).

As shown in FIG. 2, a category 3 LAN cable corresponds, in LAN standard, to 10Base-T having a maximum communication speed of 10 Mbps. A category 4 LAN cable corresponds to a token ring (16 M) having a maximum communication speed of 16 Mbps. A category 5 LAN cable corresponds to 100Base-TX having a maximum communication speed of 100 Mbps, and a category 5E LAN cable corresponds to 1000Base-T having a maximum communication speed of 1000 Mbps. A category 6 LAN cable corresponds to 1000Base-TX having a maximum communication speed of 1000 Mbps.

Since each LAN cable has a backward compatibility in terms of communication speed, a LAN cable belonging to a category that corresponds in speed to the LAN standard or belonging to a higher level category can be used. For example, to make communication at the maximum communication speed of 100 Mbps, a category 5 or 5E or 6 LAN cable can be used.

A LAN cable can be used for communication at a communication speed not higher than the maximum communication speed guaranteed by the corresponding LAN standard. For example, a category 5 LAN cable can be used for communication at a speed lower than the maximum communication speed 100 Mbps guaranteed by 100Base-TX corresponding to category 5, e.g., at the maximum communication speed 10 Mbps in 10Base-T.

Figure 3:
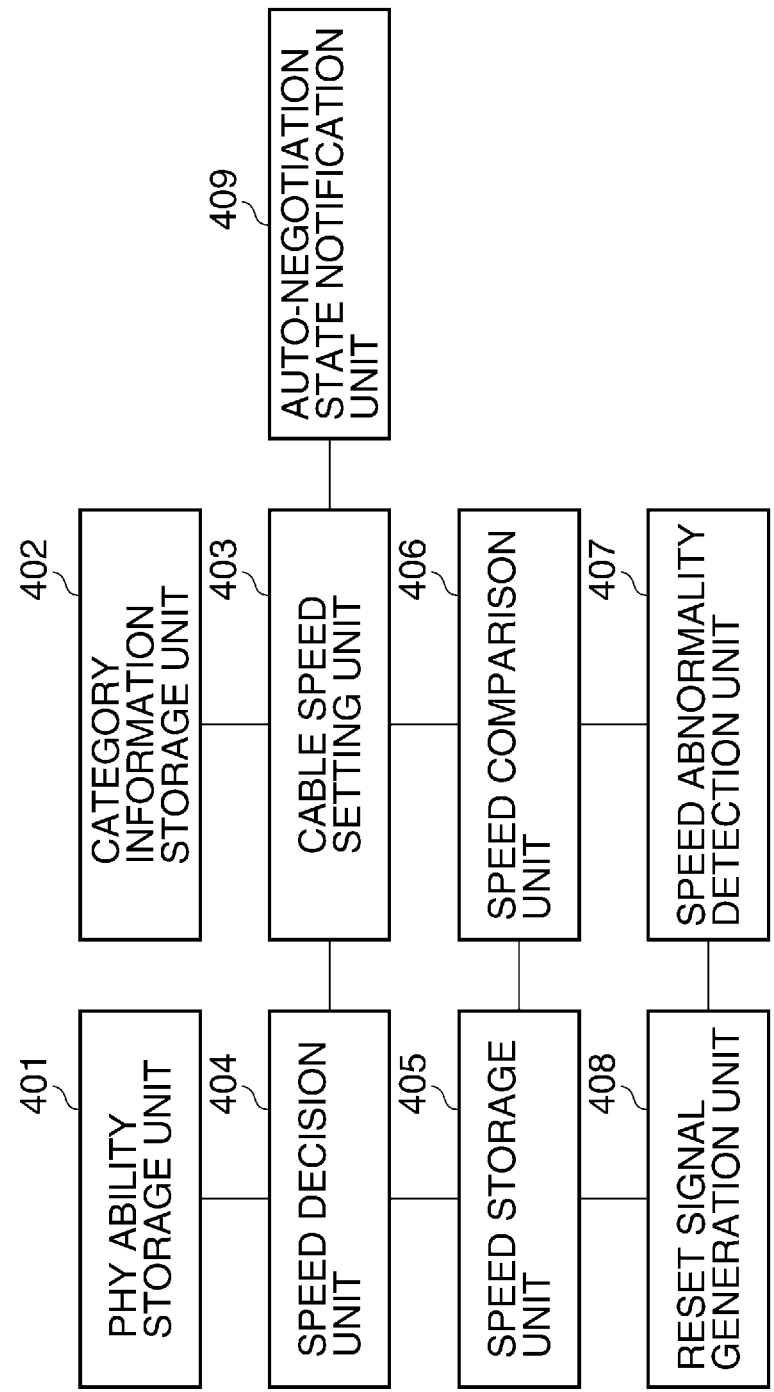
FIG. 3 is a block diagram showing an example software construction of the network device shown in FIG. 1.

FIG. 3 shows in block diagram an example software construction of the network device 100. Software modules illustrated in FIG. 3 are executed by the CPU 108. It should be noted that the illustrated functional parts of the network device 100 can be implemented by hardware such as LSI, instead of using the software modules.

In FIG. 3, reference numeral 401 denotes a PHY ability storage unit that stores information representing one or more communication speeds settable in the PHY 103 (hereinafter, such information will be sometimes referred to as the communication speeds) and notifies a speed decision unit 404 of the communication speeds settable in the PHY 103; and 402, a category information storage unit that stores category information of a LAN cable to be used and notifies a cable speed setting unit 403 of the category information stored in the storage unit 402. Based on the notified category information, the cable speed setting unit 403 decides the maximum communication speed guaranteed by the LAN cable to be used.

Reference numeral 409 denotes an auto-negotiation state notification unit that determines a setting state of the PHY 103 as to whether the PHY 103 can use the auto-negotiation and notifies the cable speed setting unit 403 of the determined setting state. Whether the PHY 103 can use the auto-negotiation function can be set by the user on a screen (not shown) displayed on the operation panel 114. When notified from the notification unit 409 that the PHY 103 is in a state capable of using the auto-negotiation, the cable speed setting unit 403 notifies the speed decision unit 404 of the maximum communication speed decided from the LAN cable category information.

The speed decision unit 404 compares the maximum communication speed, which is guaranteed by the LAN cable and notified from the cable speed setting unit 403, with each of one or more communication speeds, which are settable in the PHY 103 and notified from the PHY ability storage unit 401. The speed decision unit 404 selects, from among the communication speeds settable in the PHY 103, communication speeds equal to or lower than the maximum communication speed notified from the cable speed setting unit 403, decides the maximum communication speed among the selected communication speeds, as a communication speed to be newly set for the PHY 103, and notifies a speed storage unit 405 of the decided set communication speed (upper limit communication speed).

If the notified set communication speed differs from the set communication speed currently stored in the speed storage unit 405, the storage unit 405 stores the notified communication speed as a new set communication speed to thereby update the set communication speed, and sends to a reset signal generation unit 408 a notification that the set communication speed is updated. Upon reception of the notification, the reset signal generation unit 408 generates a reset signal for resetting the PHY 103 and supplies the reset signal to the PHY 103 via the control signal line 1a. The PHY 103 will perform the auto-negotiation based on the updated communication speed information contained in the reset signal. Specifically, the auto-negotiation will be performed based on the upper limit communication speed represented by the set communication speed information.

In a case where the PHY 103 can use the auto-negotiation, it is possible to update the set communication speed stored in the speed storage unit 405, as described above, and perform communication at the updated communication speed. However, the network device 100 is sometimes used in an environment where communication is performed at a fixedly set communication speed, without using the auto-negotiation. In that case, if the communication speed information stored in the speed storage unit 405 is changed according to the LAN cable category, there is a fear that a link with the communication counterpart cannot be established because of a mismatch in communication speed. For example, when the network device 100 communicates with an external device at a 100Base-TX communication speed, if the 100Base-TX communication speed at only one of these devices is changed to a 10Base-T communication speed, the established link is impaired or a link cannot be established.

In the following, a description will be given of operation of the network device 100 in a case where the auto-negotiation is not used and the communication speed is fixedly set.

If the PHY 103 does not use the auto-negotiation, the auto-negotiation state notification unit 409 does not send to the cable speed setting unit 403 a signal representing a state capable of using the auto-negotiation. In that case, the cable speed setting unit 403 only notifies a speed comparison unit 406 of the maximum communication speed guaranteed by the LAN cable, and the speed storage unit 405 notifies the speed comparison unit 406 of the set communication speed currently stored in the storage unit 405. If the auto-negotiation cannot be used, the set communication speed stored in the speed storage unit 405 remains fixed.

The speed comparison unit 406 compares the set communication speed stored in the speed storage unit 405 with the maximum communication speed notified from the cable speed setting unit 403. If a result of comparison indicates that the maximum communication speed is equal to or higher than the set communication speed, the currently used LAN cable does not cause a problem. On the other hand, if the maximum limit communication speed is lower than the set communication speed, the set communication speed is higher than the communication speed guaranteed by the LAN cable. In that case, the speed comparison unit 406 notifies a speed abnormality detection unit 407 that the LAN cable does not guarantee the set communication speed. In response to this, the detection unit 407 displays an abnormality message.

Next, a description will be given of how LAN cable category information is input to the category information storage unit 402. In this embodiment, it is assumed that a user does not know a relation between LAN cable category and communication speed. A category list is displayed on the operation panel 114, from which the user is able to select the category of the currently used LAN cable.

Figure 4:
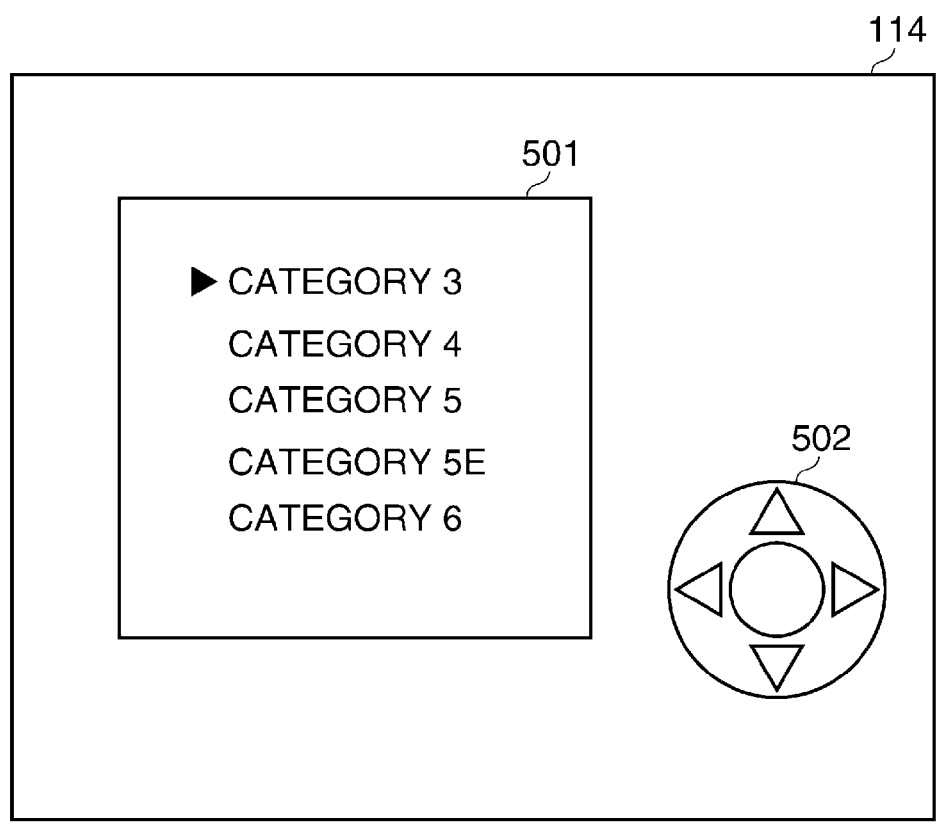
FIG. 4 is a view showing an example of how the category of a LAN cable of the network device is selected.

FIG. 4 shows an example of how the category of a LAN cable of the network device 100 is selected.

In FIG. 4, reference numeral 501 denotes an LCD (liquid crystal display) mounted to the operation panel 114. The LCD 501 displays predetermined information based on a signal accepted by the operation panel 114 from the CPU 108 via the operation panel I/F 115. In the illustrated example, a list of LAN cable categories stored in advance in the ROM 116 and read by the CPU 108 is displayed on the LCD 501.

Reference numeral 502 denotes a selection button provided on the operation panel 114. By operating the selection button 502, a user can select a desired category from the category list displayed on the LCD 501 and can notify the CPU 108 of the selected category. For example, when category 3 is selected, category information representing category 3 is notified from the operation panel 114 to the CPU 108 and stored into the category information storage unit 402. Although the desired LAN cable category is selected from the category list by using the selection button 502 in this embodiment, but this is not limitative. Category information can be input by the user into a category input field (not shown) on the LCD screen.

In a case where the auto-negotiation is not used, the speed abnormality detection unit 407 causes the LCD 501 to display an abnormal message thereon when detecting based on a notification from the speed comparison unit 406 that the currently used LAN cable does not guarantee the set communication speed stored in the speed storage unit 405. The abnormality message enables the user to recognize that communication at the set communication speed is not guaranteed.

FIG. 5 shows in flowchart an example of a communication speed setting changing process executed by the network device 100.

The CPU 108 detects the power supply of the network device 100 being turned on (step S601), and performs control to establish a link between the PHY 103 and the PHY 205 in the hub 201 connected to the PHY 103 via the LAN cable 206 (step S602).

In step S603, the CPU 108 stores, into the category information storage unit 402, LAN cable category information input by the user via the operation panel 114, and notifies the category information to the cable speed setting unit 403.

In step S604, the cable speed setting unit 403 decides the maximum communication speed that can be guaranteed by the currently used LAN cable based on the category information notified in step S603.

Next, the auto-negotiation state notification unit 409 determines whether the PHY 103 is able to use the auto-negotiation function (step S605). If it is determined that the auto-negotiation function can be used (Yes to step S605), the cable speed setting unit 403 notifies the maximum communication speed decided in step S604 to the speed decision unit 404 (step S606).

In step S607, the speed decision unit 404 compares the maximum communication speed guaranteed by LAN cable, which is notified in step S606 from the cable speed setting unit 403, with each of one or more communication speeds stored in the PHY ability storage unit 401 and settable in the PHY 103. Then, the speed decision unit 404 selects, from among the communication speeds settable in the PHY 103, communication speeds equal to or lower than the notified maximum communication speed, and decides the maximum communication speed among the selected communication speeds, as a communication speed to be newly set for the PHY 103 (i.e., an upper limit communication speed). Step S607 is an example of a first decision step. Then, the speed decision unit 404 notifies the speed storage unit 405 of the decided set communication speed.

In step S608, the speed storage unit 405 compares the notified set communication speed with the set communication speed currently stored in the storage unit 405. If these two communication speeds are different from each other, i.e., if the set communication speed is to be changed (Yes to step S608), the flow proceeds to step S609. On the other hand, if the notified set communication speed coincides with the set communication speed stored in the speed storage unit 405 (No to step S608), the present process is completed without updating the set communication speed stored in the speed storage unit 405.

In step S609, the speed storage unit 405 stores the notified set communication speed as a communication speed that can be newly used by the PHY 103, and notifies the reset signal generation unit 408 that the set communication speed is updated. The reset signal generation unit 408 generates a reset signal for resetting the PHY 103 and transmits the generated reset signal to the PHY 103.

In step S610, the PHY 103 performs a resetting based on the received reset signal, and performs the auto-negotiation to decide a communication speed to be used for communication between the network device 100 and the hub 201. Step S610 is an example of a second decision step.

If it is determined in step S605 that the auto-negotiation cannot be used (No to step S605), the flow proceeds to step S611. In step S611, the speed comparison unit 406 compares the set communication speed currently stored in the speed storage unit 405 with the maximum communication speed notified from the cable speed setting unit 403 and guaranteed by the LAN cable to determine whether the set communication speed is higher than the maximum communication speed (step S611). If the set communication speed stored in the speed storage unit 405 is equal to or lower than the maximum communication speed guaranteed by the LAN cable (No to step S612), the present process is completed. On the other hand, if the set communication speed is higher than the maximum communication speed guaranteed by the LAN cable (Yes to step S612), the speed comparison unit 406 notifies the speed abnormality detection unit 407 of speed abnormality information (step S613).

In step S614, the speed abnormality detection unit 407 receiving the speed abnormality information causes the LCD 501 of the operation panel 114 to display an abnormality message that the set communication speed exceeds the maximum communication speed guaranteed by the LAN cable, whereupon the present process is completed.

According to this embodiment, when inputting LAN cable category information, the network device that uses the auto-negotiation can decide the maximum communication speed falling within a communication speed range corresponding to the LAN cable category. It is therefore possible to prevent the communication speed from being set by auto-negotiation to a speed exceeding the maximum communication speed corresponding to the LAN cable category, whereby a packet loss in the communication, and the like can be prevented, so that unstable communication can be avoided.

It is also possible to match the communication speed with the LAN cable category, even if the user does not know the communication speed matching the LAN cable category.

It has been assumed in the above-described embodiment that the network device 100 is implemented by a multi-function peripheral, but this is not limitative. The present invention is applicable to any network-connectable device of any type.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278511, filed Dec. 8, 2009, which is hereby incorporated by reference herein in its entirety.

What is claimed is:

1. A network device able to communicate with an external device via a LAN cable, comprising:
   a displaying unit configured to display a selection screen through which a user selects a category of the LAN cable from among a plurality of categories of LAN cables;
   a storage unit configured to store category information representing the category selected by the user through the selection screen;
   a first decision unit configured to compare a maximum communication speed corresponding to the category information stored in said storage unit with each of at least one communication speed settable for the network device and decide an upper limit communication speed in communication between the network device and the external device; and a second decision unit configured to perform auto-negotiation with the external device based on the upper limit communication speed decided by said first decision unit and decide a communication speed to be set to be used for communication between the network device and the external device.

2. The network device according to claim 1, further including:
a comparison unit configured to compare the communication speed set to be used for communication between the network device and the external device with the upper limit communication speed decided by said first decision unit,
wherein in a case where a result of comparison by said comparison unit indicates that the communication speed decided by said first decision unit differs from the set communication speed, said second decision unit performs the auto-negotiation to decide the communication speed to be used for communication between the network device and the external device.

3. The network device according to claim 1, further including:
a setting unit configured to make a setting of whether said second decision unit should perform the auto-negotiation to decide the communication speed to be used for communication between the network device and the external device.

4. The network device according to claim 3, wherein in a case where the setting made by said setting unit is such that said second decision unit should not perform the auto-negotiation to decide the communication speed to be used for communication between the network device and the external device, the set communication speed is decided as the communication speed to be used for communication between the network device and the external device.

5. The network device according to claim 4, further including:
a notification unit configured to make a notification to a user in a case where the maximum communication speed corresponding to the category information stored in said storage unit is lower than the set communication speed.

6. The network device according to claim 1, wherein the plurality of categories include Category 3, Category 4, Category 5, Category 5E, and Category 6.

7. A control method for a network device able to communicate with an external device via a LAN cable, comprising:
a displaying step of displaying a selection screen through which a user selects a category of the LAN cable from among a plurality of categories of LAN cables;
a storage step of storing category information, representing the category selected by the user through the selection screen;
a first decision step of comparing a maximum communication speed corresponding to the category information stored in the storage unit with each of at least one communication speed settable for the network device and deciding an upper limit communication speed in communication between the network device and the external device; and
a second decision step of performing auto-negotiation with the external device based on the upper limit communication speed decided in said first decision step and deciding a communication speed to be set to be used for communication between the network device and the external device.

8. A non-transitory computer-readable storage medium storing a program that, when executed by a computer, causes the computer to perform a control method for a network device able to communicate with an external device via a LAN cable, the method comprising:
a displaying step of displaying a selection screen through which a user selects a category of the LAN cable from among a plurality of categories of LAN cables;
a storage step of storing category information, representing the category selected by the user through the selection screen;
a first decision step of comparing a maximum communication speed corresponding to the category information stored in the storage unit with each of at least one communication speed settable for the network device and deciding an upper limit communication speed in communication between the network device and the external device; and
a second decision step of performing auto-negotiation with the external device based on the upper limit communication speed decided in said first decision step and deciding a communication speed to be set to be used for communication between the network device and the external device.

9. A network device able to communicate with an external device via a LAN cable, comprising:
a displaying unit configured to display a selection screen through which a user selects a category of the LAN cable from among a plurality of categories of LAN cables;
a storage unit configured to store category information representing the category selected by the user through the selection screen; and
a notification unit configured to notify, in a case where a communication speed set in the network device is higher than the maximum communication speed corresponding to the category information stored in said storage unit, a predetermined message, to a user.

10. The network device according to claim 9, wherein the plurality of categories include Category 3, category 4, Category 5, Category 5E, and Category 6 of the LAN cable.

11. The network device according to claim 9, wherein the notification unit notifies, in a case where the communication speed set in the network device is higher than the maximum communication speed corresponding to the category information stored in said storage unit, that the communication speed set in the network device is higher than the maximum communication speed corresponding to the category information stored in said storage unit, to the user.

12. A control method for a network device able to communicate with an external device via a LAN cable, the method comprising:
a displaying step of displaying a selection screen through which a user selects a category of the LAN cable from among a plurality of categories of LAN cables;
a storage step of storing category information representing the category selected by the user through the selection screen; and
a notification step of notifying, in a case where a communication speed set in the network device is higher than the maximum communication speed corresponding to the stored category information, a predetermined message, to a user.

13. A non-transitory computer-readable storage medium storing a program that, when executed by a computer, causes the computer to perform a control method for a network device able to communicate with an external device via a LAN cable, the method comprising:

a displaying step of displaying a selection screen through which a user selects a category of the LAN cable from among a plurality of categories of LAN cables;

a storage step of storing category information representing the category selected by the user through the selection screen; and a notification step of notifying, in a case where a communication speed set in the network device is higher than the maximum communication speed corresponding to the stored category information, a predetermined message, to a user.

* * * * *